United States Patent
Robinson et al.

(10) Patent No.: US 9,924,074 B2
(45) Date of Patent: Mar. 20, 2018

(54) METHOD AND SYSTEM FOR ENABLING OPTIMAL COLORANT JOB PROGRAMMING

(71) Applicant: Xerox Corporation, Norwalk, CT (US)

(72) Inventors: David C. Robinson, Penfield, NY (US); Guo-Yau Lin, The Woodlands, TX (US); Michael R. Campanelli, Webster, NY (US); Timothy D. Uetz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/161,642

(22) Filed: May 23, 2016

(65) Prior Publication Data
US 2017/0339315 A1 Nov. 23, 2017

(51) Int. Cl.
| | |
|---|---|
| H04N 1/60 | (2006.01) |
| G03F 3/08 | (2006.01) |
| G06K 15/00 | (2006.01) |
| H04N 1/405 | (2006.01) |
| H04N 1/00 | (2006.01) |

(52) U.S. Cl.
CPC ....... H04N 1/6066 (2013.01); H04N 1/00411 (2013.01); H04N 1/4057 (2013.01); H04N 1/6008 (2013.01); H04N 2201/0094 (2013.01)

(58) Field of Classification Search
None
See application file for complete search history.

(56) References Cited

U.S. PATENT DOCUMENTS

| | | | |
|---|---|---|---|
| 5,416,890 A * | 5/1995 | Beretta | G06F 3/04845 345/440 |
| H1506 H * | 12/1995 | Beretta | G06F 3/04845 345/549 |
| 5,740,076 A * | 4/1998 | Lindbloom | H04N 1/6058 345/590 |
| 5,892,891 A | 4/1999 | Dalal et al. | |
| 6,043,909 A * | 3/2000 | Holub | G01J 3/50 348/E17.004 |
| 7,502,033 B1 * | 3/2009 | Axelrod | G09G 5/06 345/440 |

(Continued)

OTHER PUBLICATIONS

CIELAB—Color Models—Technical Guides, http://dba.med.sc.edu/price/irf/Adove_tg_models/cielab.html, printed May 6, 2016, 1 page.

(Continued)

Primary Examiner — Madelein Nguyen
(74) Attorney, Agent, or Firm — Kermit D. Lopez; Luis M. Ortiz; Ortiz & Lopez, PLLC (57) ABSTRACT

Method, system, and graphical user interface for enabling optimal colorant job programming. A graphical user interface displays a plurality of gamut mode selectable features. One or more of the gamut mode selectable features can be selected for image processing of an image. A graphical image can be displayed within the next of the user interface based on image processing of the image, and in response to selection of a gamut mode selectable feature. The resulting displayed graphical image with the user interface can demonstrate to a user the benefit of utilizing additional colorant on the image particular pixels in the graphical image, which can benefit from the additional colorant.

20 Claims, 6 Drawing Sheets

(56) References Cited

U.S. PATENT DOCUMENTS

| | | | |
|---|---|---|---|
| 7,869,739 B2 | 1/2011 | Mashtare et al. | |
| 7,990,592 B2 | 8/2011 | Mestha et al. | |
| 8,204,403 B2 | 6/2012 | Nowak et al. | |
| 8,259,346 B2 | 9/2012 | Walton et al. | |
| 8,467,114 B2 | 6/2013 | Yakubov | |
| 9,070,076 B1* | 6/2015 | Smith | G06K 15/1878 |
| 9,699,357 B1* | 7/2017 | Das | H04N 1/6066 |
| 9,706,085 B1* | 7/2017 | Lin | H04N 1/6066 |
| 2005/0283735 A1* | 12/2005 | Ferlitsch | G06F 3/04817 715/771 |
| 2008/0204829 A1* | 8/2008 | Harrington | H04N 1/6094 358/504 |
| 2008/0259363 A1 | 10/2008 | Walton et al. | |
| 2009/0147021 A1* | 6/2009 | Glen | G09G 5/02 345/603 |
| 2009/0310152 A1* | 12/2009 | Roulland | H04N 1/603 358/1.9 |
| 2010/0225942 A1* | 9/2010 | Murai | H04N 1/52 358/1.9 |
| 2010/0306645 A1* | 12/2010 | Roulland | G06F 9/4446 715/271 |
| 2011/0317915 A1* | 12/2011 | Gil | H04N 1/6022 382/167 |
| 2013/0176326 A1* | 7/2013 | Safaee-Rad | G06T 11/001 345/590 |
| 2013/0321658 A1* | 12/2013 | Aokage | H04N 5/202 348/220.1 |
| 2013/0329994 A1* | 12/2013 | Webb | G09G 5/02 382/167 |
| 2014/0009769 A1* | 1/2014 | Robinson | H04N 1/54 358/1.9 |
| 2014/0036105 A1* | 2/2014 | Iwaki | H04N 9/67 348/223.1 |
| 2014/0168712 A1* | 6/2014 | Smith | H04N 1/603 358/3.23 |
| 2015/0158317 A1 | 6/2015 | Simoni et al. | |
| 2015/0237220 A1 | 8/2015 | Seetharam et al. | |

OTHER PUBLICATIONS

Color Gamut definition from PC Magazine Encyclopedia, http://www.pcmag.com/encyclopedia/term/39985/color-gamut, printed May 7, 2016, 8 pages.

ICC Profile—Wikipedia, the free encyclopedia, printed May 6, 2016, 4 pages.

Raster image processor—Wikipedia, the free encyclopedia, printed May 9, 2016, 2 pages.

Tone reproduction—Wikidpedia, the free encyclopedia, printed May 7, 2016, 3 pages.

* cited by examiner

METHOD AND SYSTEM FOR ENABLING OPTIMAL COLORANT JOB PROGRAMMING

TECHNICAL FIELD

Embodiments are generally related to the field of image processing. Embodiments are also related to machines having print engines such as printers and/or copier devices and, more particularly, to printer color management in image/text printing or display systems. Embodiments further relate to color gamut extension applications and devices.

BACKGROUND

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK) defines a "color space" that includes all colors that can result from any combination of these primaries. The "color space" or "color gamut" may be quite different for different sets of primaries. A CMYK color gamut can intersect an RGB color gamut. Such gamuts, however, are different from one another. That is one gamut or a set of gamuts is not a subset of the other. Thus, RGB may not cover all CMYK colors and vice versa.

In forming multi-color output images on an image-receiving medium, each of the primary colors can be transferred to the image-receiving medium in turn. The color gamut is defined by the interaction of the primary colors and is limited by the total amount of colorant in any combination that can be effectively deposited on the image-receiving medium.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image processing method and system.

It is another aspect of the disclosed embodiments to provide for an improved method and system for printer color management in image/text printing or display systems.

It is yet another aspect of the disclosed embodiments to provide for a method and system that provides a user with a better understanding of what pixels in an image-processed image will benefit from an extended gamut colorant.

The aforementioned aspects and other objectives and advantages can now be achieved as described herein. In one example embodiment, a method can be implemented for enabling optimal colorant job programming. Operations can be implemented, for example, for providing a user interface that displays a plurality of gamut mode selectable features, selecting at least one gamut mode selectable feature among the gamut mode selectable features for image processing of an image, and displaying a graphical image based on at least one some image processing of the image in response to selecting a gamut mode selectable feature, such that the resulting displayed graphical image demonstrates the benefit of utilizing additional colorant on the image. For example, pixels in the displayed graphical image, which can benefit from the additional colorant, can be highlighted to demonstrate this benefit.

In some example embodiments, a step or operation can be implemented for releasing the image or re-programming the image with different color settings based on the displayed graphical image. In another example embodiment, operations can be implemented including image processing of the image by rendering all color spaces with respect to the image to, for example, a multi-color print space (e.g., 5 color print space), and then comparing the multi-color print space to a possible CMYK print space to determine the particular pixels benefiting with a particular print job/page.

The disclosed approach thus can provide a method and/or system, which enables accurate user understanding of the pixels in a RIPed image that can benefit from an extended gamut colorant. All the color spaces in the PDL (e.g., RGB, CMYK, Spots, Separation, DeviceN) can be rendered by the RIP (Raster Image Processor) containing all the RIP's image processing complexity to the 5 color print space. This print space can then be compared to the possible CMYK print space to determine the benefiting pixels within a job/page.

Various embodiments may be implemented via a device or system comprising a processor and a memory. The processor and memory are configured to perform one or more of the above described method operations. Other embodiments may be implemented via a computer readable storage medium having computer program instructions stored thereon that are arranged to perform one or more of the method operations described above and elsewhere in this disclosure.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
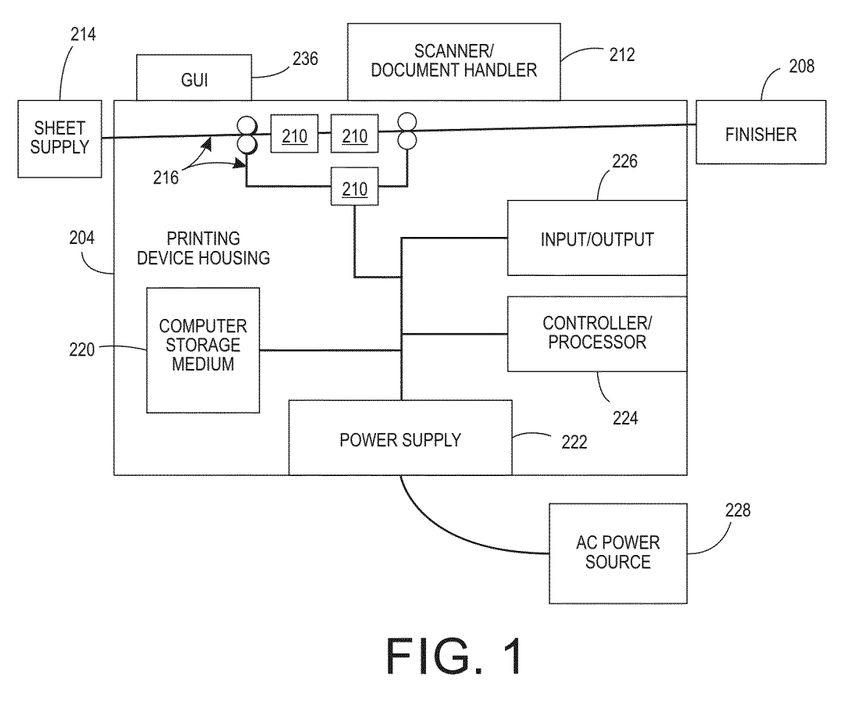
FIG. 1 illustrates a schematic diagram of a digital printing system that can be utilized in accordance with an example embodiment.

FIG. 1 illustrates a schematic diagram of a computerized device that can be implemented as a printing device or system 204, which can be used with systems and methods herein and can comprise, for example, a printer, copier, multi-function machine, multi-function device (MFD), etc. The printing device/system 204 can include many of the components mentioned above (e.g., printer, copier, MFD, etc.) and in some embodiments at least one marking device (print engine) 210 operatively connected to a computerized device 224 (e.g., controller and/or processor), a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, exemplary systems and printing devices herein can comprise a computerized device 224 that receives a print job. The computerized device 224 can evaluate the print job to identify job parameter settings and associated sources of such job parameter settings. A non-transitory computer storage medium 220 is operatively (meaning directly or indirectly) connected to the computerized device 224, and the computerized device 224 transmits the job parameter settings and the associated sources to a database stored within the non-transitory computer storage medium 220. Each print job can have its own separate database.

In addition, a marking device 210 can be operatively connected to the computerized device 224. The computerized device 224 transmits the print job to cause the marking device 210 to print the print job. Also, a graphic user interface 236 is operatively connected to the computerized device 224, and the graphic user interface 236 provides access to the database to allow a user to view the job parameter settings and the associated sources, and/or change the job parameter settings. The graphic user interface 236 provides access to the database before or after the marking device 210 prints the print job.

The computerized device 224 can raster image process the print job before printing the print job using the marking device 210. Further, the computerized device 224 can identify "potential" settings and sources and "final" settings and sources of the job parameter settings and the associated sources when evaluating the print job. These final settings and sources are the ones actually used to perform the raster image processing (RIPing); however, all the potential setting and sources are all maintained in the database to provide a pre-RIPing print job preparation history. Further, the database maintains the potential setting and sources and the final settings and sources before and after the marking device 210 prints the print job to allow user diagnosis, etc.

Specifically, these "associated sources" can include, for example: a print job property attributes source; a print job ticket attributes source; a print queue attributes source; and a page exception attributes source, etc. Similarly, the "job parameter settings" can include, for example: print job properties values; print job ticket values; print queue values; and page exception source values, etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image processor (RIP) is a component used in a printing system that produces a raster image also known as a bitmap. The bitmap is then sent to a printing device for output. Raster image processing is the process that turns vector digital information into a high-resolution raster image.

It is helpful to understand the terminology that is used in reference to printing in this context. The term "page" refers to the data corresponding to the content on one page of the finished document. The term "sheet" refers to a single piece of print media, which can be printed with more than one page. Sheets also have two sides and can have pages printed on one or both sides. A "document" comprises a group of one or more sheets having one or more pages printed thereupon.

The term "color gamut" as utilized herein can refer to the entire range of colors available on a particular device such as a monitor or printer. A monitor, which displays RGB signals, typically has a different color gamut than output by a printer and greater color gamut than a printer, which uses CMYK inks. Thus, when a color is "out of gamut," it cannot be properly converted to the target device, for example, to a different type of printer.

In some example embodiments, the digital printing system shown in FIG. 1 can be configured with the capability of adding a fifth color for printing. That is, the available colorants are Orange, Green, and Blue. When job programming an extended gamut job, two destination profiles can be applied to the print job:

1. For printing to the extended gamut (e.g., CMYK+ Orange)
2. For printing to the base gamut (CMYK)

On these extended gamut print engines, a server or other computing can require the capability to visually display how the use of an extended gamut colorant mode will provide improved IQ via a larger gamut on a customer's job without printing two proofs of the job with different job programming. Use of the 5th colorant is expensive as compared to the CMYK colorants.

Therefore, an approach can be implemented as discussed in greater detail below, which can reveal to a user whether the use of, for example, the 5th colorant will be beneficial. Such an approach can be implemented in the context of a display that comprehends all the input image types (e.g., RGB source, CMYK source, deviceN, Spot) within the PDL and the job programming (e.g., Spot rendering with the CMYK colorants or the CMYK+Extended Gamut colorant).

Figure 2:
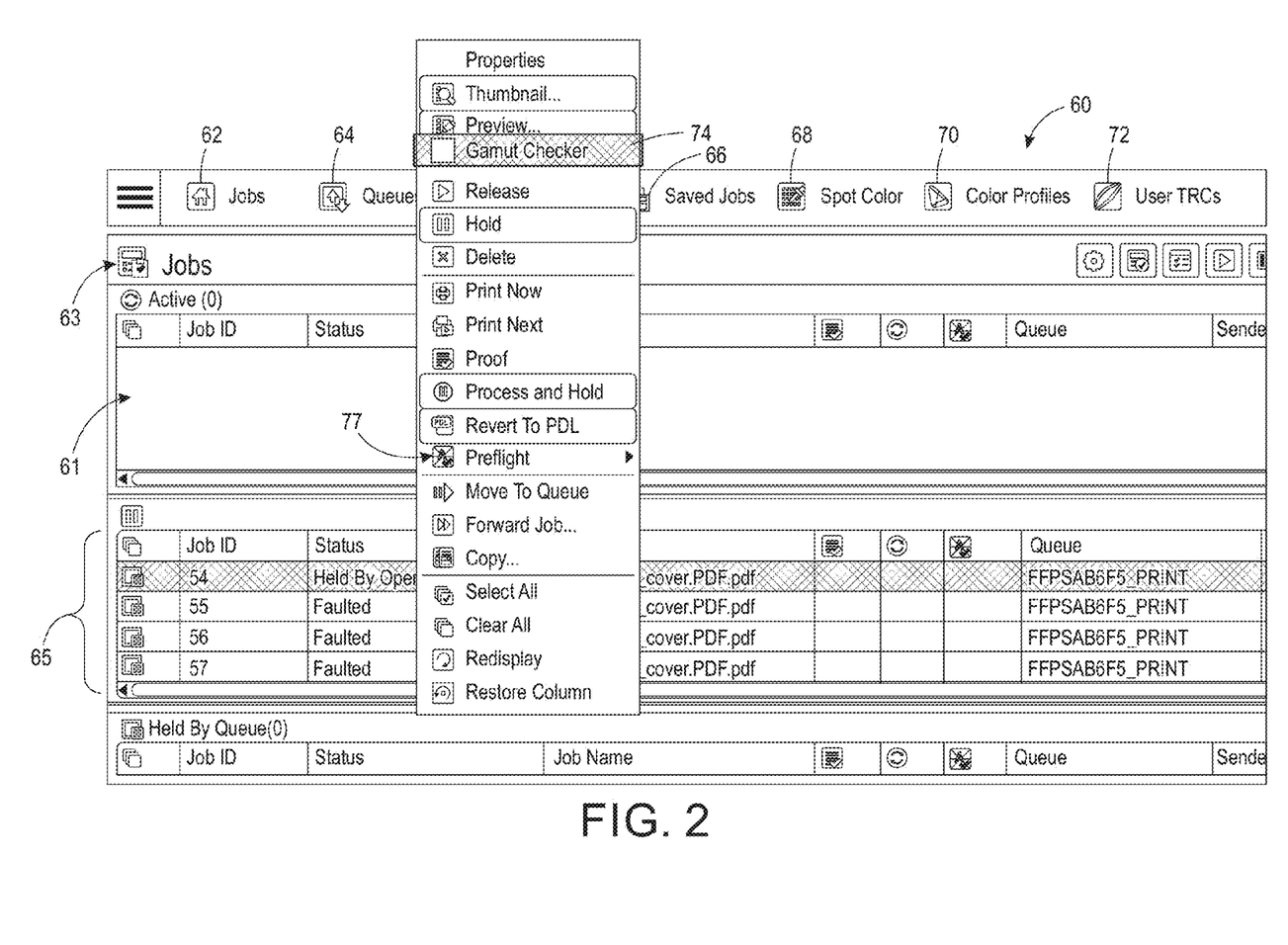
FIG. 2 illustrates another GUI for enabling optimal colorant job programming in accordance with an example embodiment.

FIG. 2 illustrates a GUI (Graphical User Interface) 60, which can be utilized for jobs in a Held state (e.g., fully job programmed) to initiate the Gamut Check feature. For the extended gamut mode print system, the feature only becomes active when the job is programmed for extended gamut printing. When a user activates this feature, the job can be sent through and processed by a low-resolution fully featured decomposer. The resultant CMYK+Extended Gamut image(s) can be converted to, for example, CIELAB. The gamut boundary of the job programmed 4-color profile can be determined in the CIELAB space. A threshold can then be added to the gamut boundary (e.g., 2 $\Delta E$). The resultant boundary can be compared to the CIELAB values for the pixels composing the RIPed images (i.e., images subject to an RIP (Raster Image Processor)). Pixel values lying outside the boundary are determined to benefit from the use of the extended gamut colorant. The information can be communicated to users via a display of the RIPed image with the benefiting pixels highlighted.

Note that the term CIELAB (CIE L*a*b*) is a color space specified by the International Commission on Illumination (French Commission Internationale de l'eclairage, hence its CIE initialism). CIELAB describes all the colors visible to the human eye and was created to serve as a device-independent model to be used as a reference. The three coordinates of CIELAB represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow). The asterisk (*) after L, a, and b are pronounced star and are part of the full name, since they represent L*, a*, and b*, to distinguish them from Hunter's L, a, and b, described below.

Since the L*a*b* model is a three-dimensional model, it can be represented properly only in a three-dimensional space. Two-dimensional depictions include chromaticity diagrams: sections of the color solid with a fixed lightness. It is crucial to realize that the visual representations of the full gamut of colors in this model are never accurate; they are there just to help in understanding the concept. Because the red-green and yellow-blue opponent channels are computed as differences of lightness transformations of (putative) cone responses, CIELAB is a chromatic value color space.

Note that in color management, an ICC profile is a set of data that characterizes a color input or output device, or a color space, according to standards promulgated by the International Color Consortium (ICC). Profiles describe the color attributes of a particular device or viewing requirement by defining a mapping between the device source or target color space and a profile connection space (PCS). This PCS is either CIELAB (L*a*b*) or CIEXYZ. Mappings can be specified utilizing tables, to which interpolation can be applied, or through a series of parameters for transformations.

The GUI 60 shown in FIG. 2 can offer a gamut checker option 74 that when selected takes an image and compares how that image will print with two different ICC profiles. The ICC profiles supported are for 4 and 5 ink formats. Either one can be placed in either ICC file field. The final output will display the image and a modified version of the image showing a comparison of the image rendered through each profile. The modified image consists of the differences of the larger gamut profile vs. the smaller. The colors that show as, for example, florescent green are areas where the smaller gamut profile color will be out of gamut.

When the gamut checker option 74 is selected, the job is submitted for processing with the following special parameter set:

1. Attr_Save Location=Xerox-PS/data/gamutthumbnails/Job_"JobID"/CMYKX—location for CMYKX JPEG images
2. Attr_ProcessColorants=(Cyan, Magenta, Yellow, Black, "5thcolorantname")—color planes to be used when decomposing the job
3. Attr_ProofType=proof_gamutcompare—job type
4. Attr_SaveFormat=JPEGCompareFormat—JPEG format for processing
5. Attr_Resolution=75, 75—low resolution for performance and thumbnail display When the GUI observes the JPEG images in the save location, the GUI can invoke the Gamut Check Library with the following information:
1. jobID—for thumbnail location
2. CMYK and CMYKX destination profiles
3. Output location for resultant comparison image The Gamut Check Library can perform the following operations:
1. Obtain CMYKX low resolution image(s)
2. Using the CMYKX profile, produce a print simulation image for visual display and job identification output written to Xerox-PS/data/gamutthumbnails/Job_"JobID"/CMYKX2RGB
3. Establish the colors of the image derived from the CMYKX low resolution image, i.e., a complete histogram of all colors in 3D color space
4. Retrieve or Derive the gamut of the CMYK profile
5. Map the histogram of colors through the CMYK profile forcing compression of the CMYKX color space
6. Generate the color samples difference between CMYK and CMYKX colors, i.e., the colors in the space between the two gamuts
7. The difference color set are those colors benefiting from the use of the larger gamut profile, e.g., CMYKX
8. The difference color set is mapped through the CMYKX2RGB image highlighting the affected pixels. The output is written to Xerox-PS/data/gamutthumbnails/Job_"JobID"/differencethumbnail When completed, the observant GUI displays the resultant image. Based on the displayed image(s), the user can release the job or re-program the job with different color settings to yield a different cost/IQ tradeoff. The GUI 60 shown in FIG. 2 can thus enable optimal colorant job programming. The GUI 60 can be utilized to implement a variety of job colorant operations and displays various GUI widgets, icons, and buttons that a user may select to achieve certain operations. For example, when a user selects a job icon 62, the status of various rendering jobs (e.g., print jobs) are shown as indicated at display section 65 of the GUI 60. A graphical display area 61 in GUI 60 can list active jobs with respect to a job header or title 63

Examples of job status as shown in display section 65 of GUI 60 include "Held by Operator" and "Faulted". For example, a Job ID 54 is shown as having a "Held by Operator" status and a Job ID 55 is shown as having a "Faulted" status. Other icons or widgets displayed in GUI 60 include a Queue icon 64 which when selected by a user lists a current queue of jobs. An icon 66 when selected by a user can list saved job. Icon 68 when selected by a user can initiate spot color operations with respect to a particular job (or jobs). Icon 70 can be selected by a user to initiate color profiles with respect to particular jobs.

Additionally, icon 72 can be selected by a user to initiated user TRCs (Tone Reproduction Curves). Note that TRC or tone reproduction curve involves tone reproduction, which is the mapping of scene luminance and color to print reflectance or display luminance with aim of subjectively "properly" reproducing brightness and "brightness differences." A tone reproduction curve is often referred to by its initials, TRC, and the "R" is sometimes said to stand for "response" as in tone response curve. Thus, the term TRCs can refer to tone reproduction curves or tone response curves.

Other GUI widgets or buttons displayable by GUI 60 include, for example, a preflight icon/widget 77, which when selected by a user can initiate various preflight operations, and an icon/widget 74 for a gamut checker option, which when selected by a user can display another GUI display area (e.g., a dialog box) such as the described gamut checker. The gamut checker 74 can in some embodiments be implemented in the context of a drop down list with additional options that can be selected, such as, for example, ignore low L*, saving generated files, and so on.

Note that examples of preflight operations and related methods and systems, which can be initiated by selecting the preflight icon/widget 77 shown in FIG. 2 are disclosed in U.S. Pat. No. 9,070,076 entitled "Spot Color Preflight for Extended Gamut Printing," which issued on Jun. 30, 2015 to Smith et al. U.S. Pat. No. 9,070,076 is incorporated herein by reference in its entirety.

Figure 3:
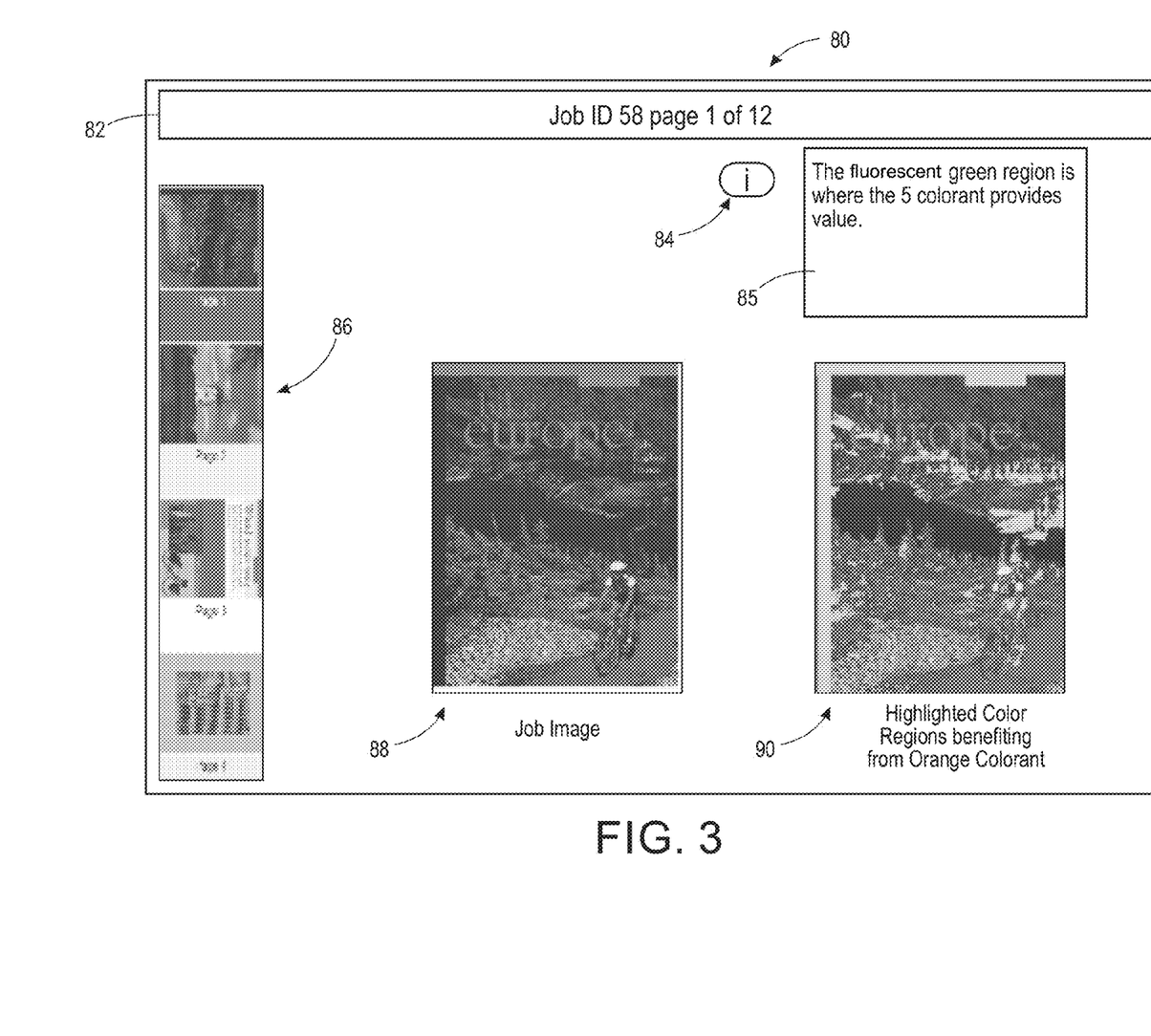
FIG. 3 illustrates interactive diagrams displayable via a GUI in accordance with an example embodiment.

FIG. 3 illustrates an interactive diagram 80 displayable via a GUI in accordance with an example embodiment. In the example depicted in FIG. 4, a header 82 displays information associated with a particular job as "Job ID 58 page 1 of 12". At the left side of the interactive diagram 80 is displayed a series of thumbnail images 86 and their respective page numbers. For example, the "Page 1" thumbnail image is followed immediately by the "Page 2" thumbnail image and so on. A larger version of the Page 1 thumbnail image is shown to the right of thumbnail images 86 as job image 88. To the right of the job image 88 is an image 90, which is a version of the job image 88 with highlighted color regions benefiting from, for example, an orange colorant. The image 90 is the resulting displayed graphical image that demonstrates to a user the benefit of utilizing additional colorant on the job image 88. That is, particular pixels in the graphical image 88 can benefit from additional colorant, which is highlighted in the resulting image 90 to demonstrate this benefit.

Above the images 88 and 90 are displayed an information "i" icon 84 just to the left of a displayed box 85, which displays colorant text information for a user such as, for example, "the fluorescent green region is where the 5 colorant provides value".

Figure 4:
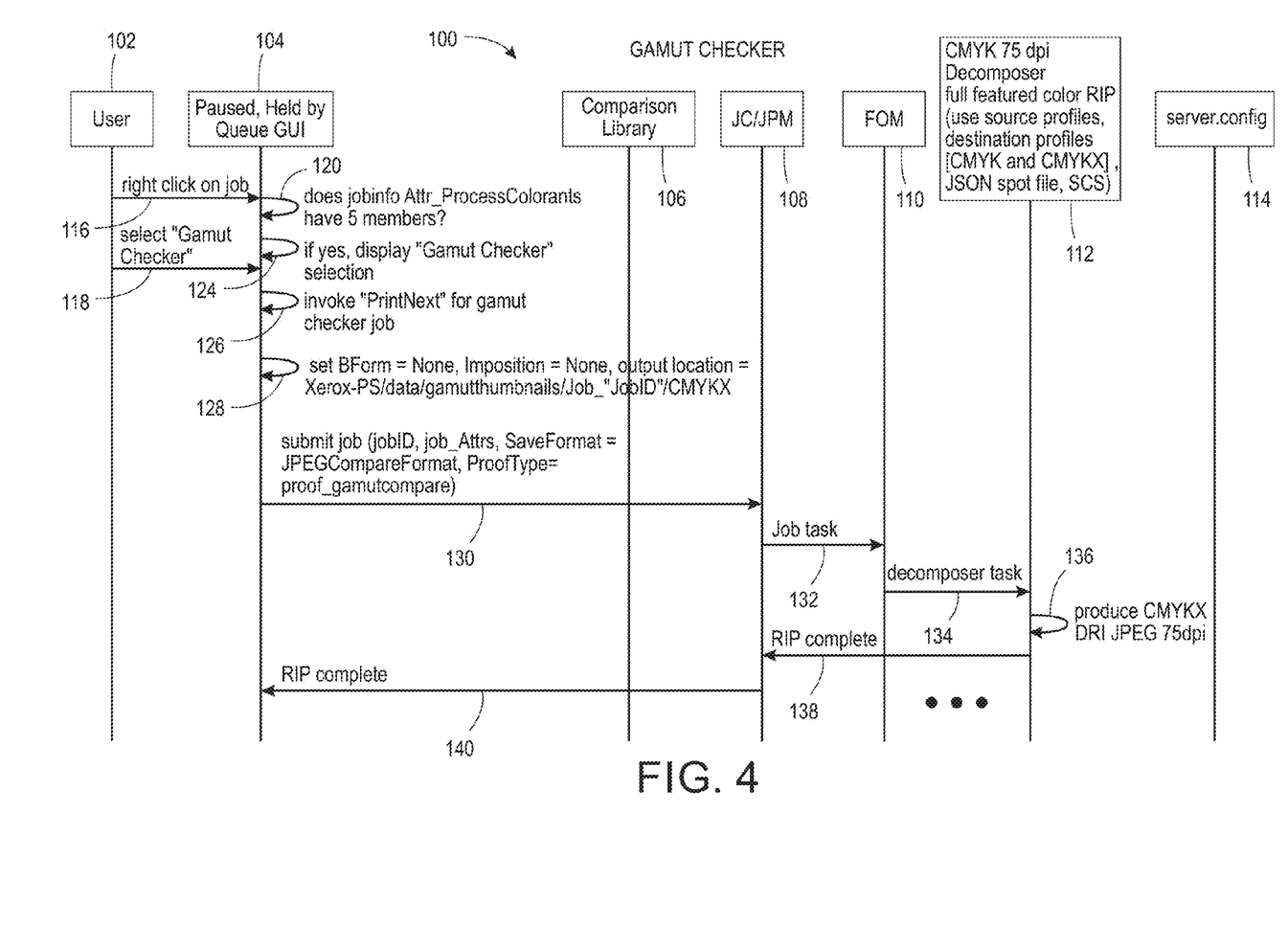
FIG. 4 illustrates a flow diagram depicting logical operations of a method for enabling optimal colorant job programming in accordance with an example embodiment.

FIG. 4 illustrates a flow diagram depicting logical operations of a method 100 for enabling optimal colorant job programming in accordance with an example embodiment.

As shown in FIG. 4, a user 102 can right "click" on a job. This operation is indicated by arrow 116. The user may also select as shown at arrow 118 the "Gamut Checker" icon/widget 74 depicted in FIG. 2. Then, as depicted at block 104, an operation can be implemented in which the job is paused and held in a queue by the GUI.

Various operations can be then implemented at this point, such as determining if "job info Attr_ProcessColorants" have 5 members as indicated by arrow 120. If the answer to this test is "yes," then as shown at arrow 124, the "Gamut Checker" selection is displayed. As indicated at arrow 126, "PrintNext" can be invoked for the gamut checker job. As indicated by arrow 128, an operation can be implemented to set BForm=None, Imposition=None, output location=Xerox-PS/data/gamutthumbnails/Job_"JobID"/CMYKX Additionally, as indicated by arrow 130, the following operation can be implemented:
submit job (jobID, job_Attrs, SaveFormat=JPEGCompareFormat, ProofType=proof_gamutcompare)

Note that Gamut Checker operations can include the use of a comparison library as shown at block 106, a JC/JPM (Job Chooser/Job Pool Manager) as indicated at block 108, and an FOM (Facilities Object Manager) as depicted at block 110. The JC (Job Chooser) can ensure that a job has been programmed correctly prior to being sent to a RIP. The JPM (Job Pool Manager) can function as a scheduler that places jobs in a priority order. The FOM (Facilities Object Manager) can obtain a job from the JC and build tasks for different modules in the stream. A decomposer functionality is indicated at block 112 followed by an operation as shown at block 114 for configuring a server (such as described previously). The server.config block 114 represents a configuration file that can be maintained at a server and processed by the server, which describes the configuration of a DFE (Digital Front End). The server.config operation depicted at block 114 can provide basic setup information that drives, for example, a GUI such as the GUI 60 shown in FIG. 2. The operation (and file) indicated at block 114 describes how, for example, a controller can be set up for a particular print engine.

A job task operation is indicated by arrow 132, followed by a decomposer task operation as shown at arrow 134. The decomposer shown at block 112 can be implemented as a CMYK 75 dpi decomposer full featured color RIP (Raster Image Processor) that is capable of utilizing source profiles, destination profiles (CMYK and CMYKX), JSON spot file, and SCS. A decomposer task operation associated with the decomposer indicated at block 112 is represented by the arrow 134 shown between block 110 (FOM) and block 112 (decomposer). Arrow 136 represents the production of CMYKX DRI JPEG 75 dpi image. Arrows 138 and 140 represent additional RIP complete operations.

Figure 5:
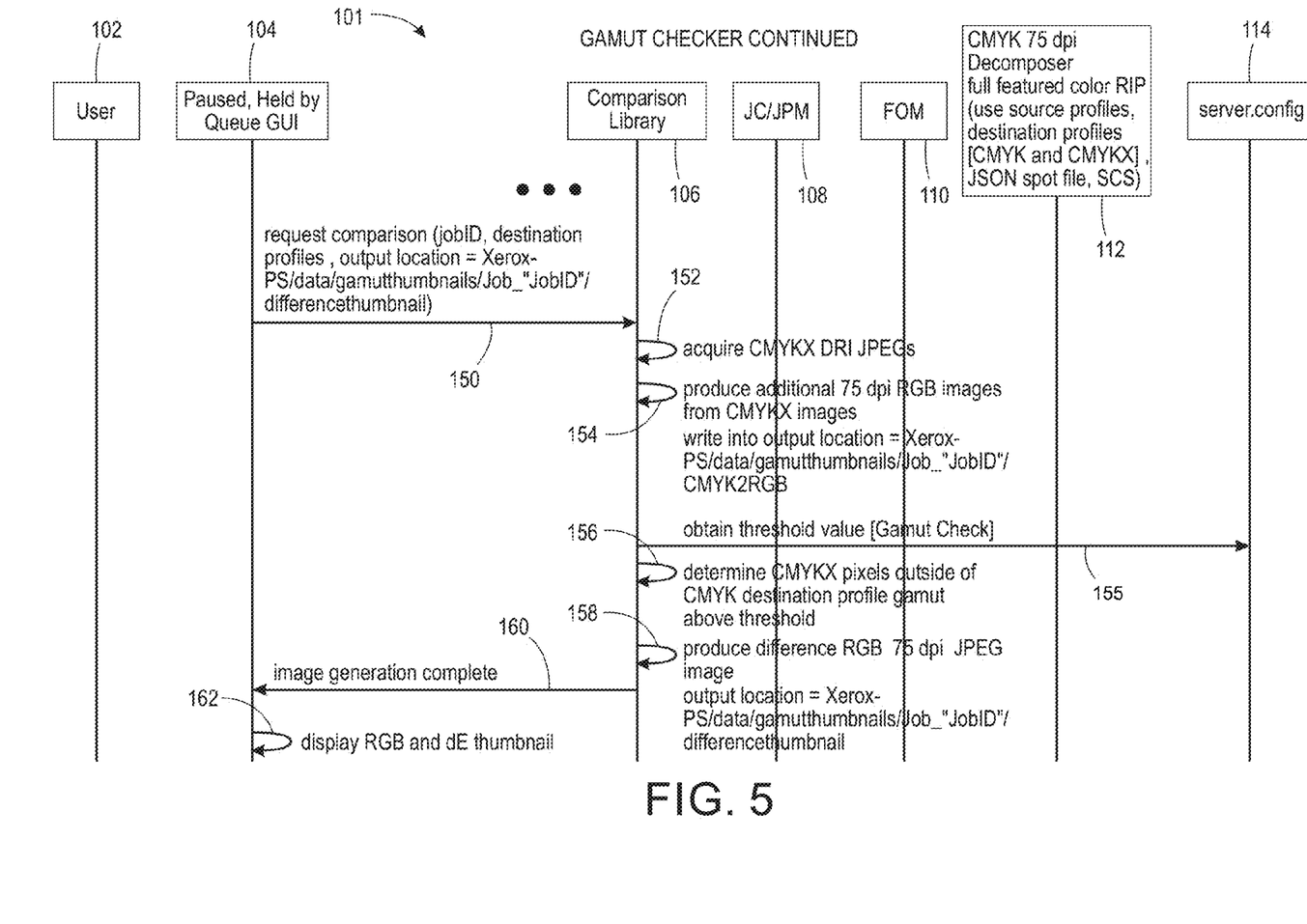
FIG. 5 illustrates another flow diagram depicting logical operations of a method for enabling optimal colorant job programming in accordance with an example embodiment.

FIG. 5 illustrates a continuation of the flow logic from FIG. 4. That is, FIG. 5 depicts a flow diagram depicting logical operations of a method 101 for enabling optimal colorant job programming in accordance with an example embodiment. The method 101, however, shown in FIG. 5 is a continuation of the method 100 depicted in FIG. 4. Note that in FIGS. 4-5, identical or similar parts or elements are generally indicated by identical reference numerals. For example, blocks 102, 104, 106, 108, 110, 112, and 114 shown in FIGS. 4-5 indicate the same general elements or operations. The method 101 shown in FIG. 5 thus represents additional operations, which can be implemented with respect to the operations shown in FIG. 4. For example, the arrow 150 shown as extending between block 104 ("Paused, Held by Queue GUI") and block 106 ("Comparison Library") involves the following operation:
request comparison (jobID, destination profiles, output location=Xerox-PS/data/gamutthumbnails/Job_"JobID"/differencethumbnail)

Following processing of the operation indicated by arrow 152, CMYKX DRI JPEGs can than acquire an additional 75 dpi RGB image produced from the aforementioned CMYKX images. Then, as shown at arrow 154, the following operation can be implemented:
Write into output location=Xerox-PS/data/gamutthumbnails/Job_"JobID"/CMYK2RGB Thereafter, as indicated by arrow 155, a threshold value (i.e., Gamut Check) can be obtained. Note that the operation associated with arrow 155 extends from the comparison library block 106 to the server configuration block 114. An operation can be implemented as indicated by arrow 156 to determine CMYKX pixels outside of a CMYK destination profile gamut that are above the threshold value. Next, as indicated by arrow 158, a difference RGB 75 dpi JPEG image can be produced and the following operation implemented:
output location=Xerox-PSdata/gamutthumbnails/Job_"JobID"/differencethumbnail The image generation can then be completed, as shown at arrow 160 and an RGB and dE thumbnail displayed, as shown at arrow 162.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
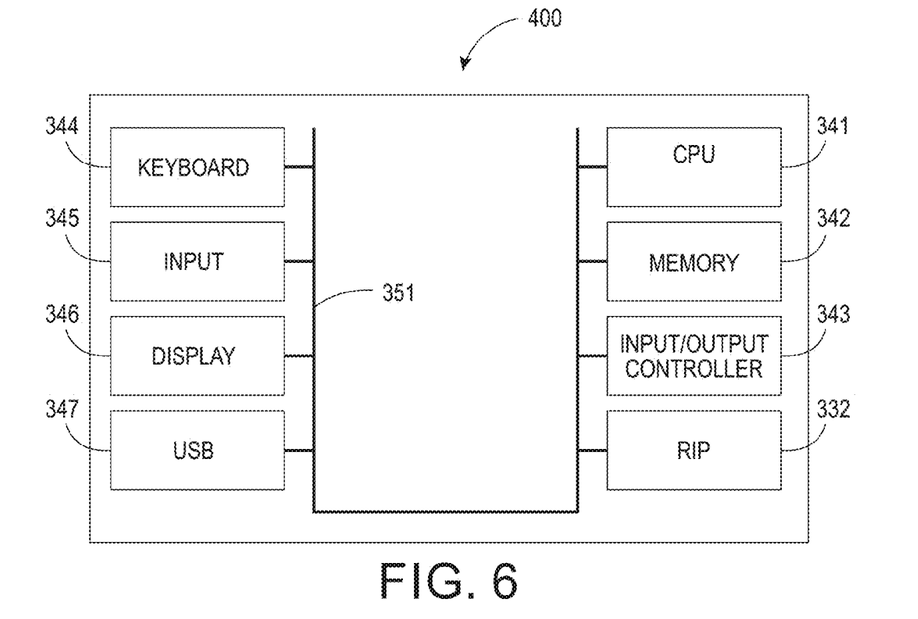
FIG. 6 illustrates a system for data-processing apparatus or system that can be utilized to implement instructions for enabling optimal colorant job programming, in accordance with an example embodiment.
Figure 7:
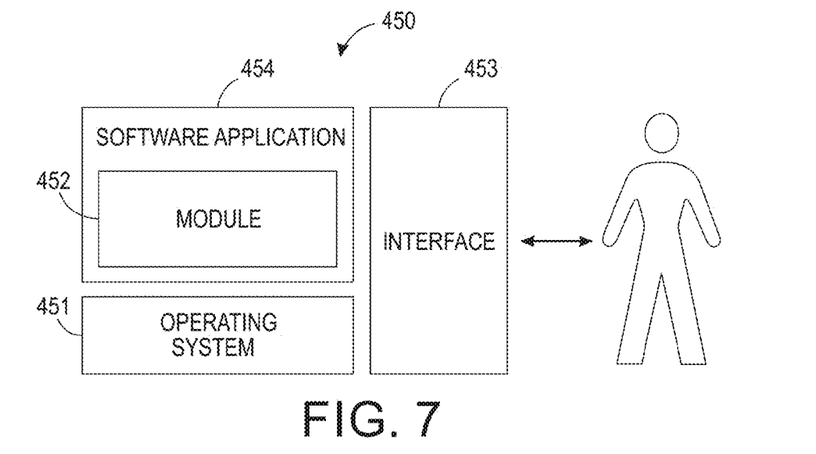
FIG. 7 illustrates a schematic view of a software system including a module, an operating system, and a user interface, in accordance with an example embodiment.

FIGS. 6-7 are provided as exemplary diagrams of data-processing environments in which embodiments may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 400 that can include one or more processors such as a CPU (Central Processing Unit) 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, an RIP (Raster Image Processor) 332, which may be implemented in the context of software and/or hardware. For example, in some embodiments, the RIP may be stored as a module in memory 342 with raster image processing operations/instructions, which are then subject to processing by the CPU 341 and/or other another processor or processors if necessary. In some example embodiments, the RIP 332 can be implemented either as a software component of an operating system or as a firmware program executed on a microprocessor inside a printer, though for high-end typesetting, standalone hardware RIPs are sometimes used.

Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on. In some example embodiments, the data-processing system 400 may implement all or a part of the device/system shown in FIG. 1.

FIG. 7 illustrates a computer software system 450 for directing the operation of the data-processing system 400 shown in FIG. 6. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include the various steps or operations described with respect to FIGS. 6-7 and elsewhere herein. Another example of a module that can be provided by module 452 is the RIP 332 depicted in FIG. 6, which may be stored in memory 342 and processed by, for example, the CPU 341 and/or another processor.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interact with such a database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the various instructions or steps such as described herein, can be implemented in the context of such a module or modules, sub-modules, and so on.

FIGS. 6-7 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for enabling optimal colorant job programming, comprising:
   selecting with at least one gamut checker option associated with a gamut checker at least one gamut mode selectable feature from among a plurality of gamut mode selectable features for image processing of an image, wherein said at least one gamut checker options becomes available when a job is selected for extended gamut printing;
   displaying a graphical image for said job based on at least one some image processing of said image in response to said selecting said at least one gamut mode selectable feature, wherein said displayed graphical image demonstrates a benefit of utilizing additional colorant on said image, wherein particular pixels in said graphical image that can benefit from said additional colorant are highlighted to demonstrate said benefit; and
   thereafter rendering said graphical image of said job via an MFD (Multi-Function Device) comprising a combined photocopier, printer, and scanner, said MFD having at least one marking device in a response to a user input with respect to said MFD, wherein a media path in said MFD is positioned to supply sheets of media from a sheet supply to said at least one marking device wherein said graphical image of said job is rendered via at least one sheet derived from said sheet supply.

2. The method of claim 1 further comprising displaying a user interface, which displays said plurality of gamut mode selectable features in a first window of said user interface and said graphical image in another window of said user interface.

3. The method of claim 2 further comprising re-programming said image with different color settings based on said displayed graphical image.

4. The method of claim 1 further comprising:
   image processing of said image by rendering at least one color space with respect to said image to at least one color print space.

5. The method of claim 1 further comprising:
   comparing at least one print space to a possible CMYK print space to determine said particular pixels benefiting with a particular print job/page.

6. The method of claim 1 further comprising:
   image processing of said image by rendering all color spaces with respect to said image to at least one color print space; and
   comparing said at least one color print space to a possible CMYK print space to determine said particular pixels benefiting with a particular print job/page.

7. The method of claim 1 wherein said at least one gamut mode selectable feature comprises printing CMYK with varying ink drop sizes to provide an indication of a benefit of utilizing greater or smaller ink drop sizes.

8. A system for enabling optimal colorant job programming, said system comprising:
   at least one processor; and
   a computer-usable medium embodying computer program code, said computer-usable medium capable of communicating with said at least one processor, said computer program code comprising instructions executable by said at least one processor and configured for:
   selecting with at least one gamut checker option associated with a gamut checker at least one gamut mode selectable feature from among a plurality of gamut mode selectable features for image processing of an image, wherein said at least one gamut checker options becomes available when a job is selected for extended gamut printing;
   displaying a graphical image based on at least one some image processing of said image in response to said selecting said at least one gamut mode selectable feature, wherein said displayed graphical image demonstrates a benefit of utilizing additional colorant on said image, wherein particular pixels in said graphical image that can benefit from said additional colorant are highlighted to demonstrate said benefit; and
   thereafter rendering said graphical image of said job via an MFD (Multi-Function Device) comprising a combined photocopier, printer, and scanner, said MFD having at least one marking device in a response to a user input with respect to said MFD, wherein a media path in said MFD is positioned to supply sheets of media from a sheet supply to said at least one marking device wherein said graphical image of said job is rendered via at least one sheet derived from said sheet supply.

9. The system of claim 8 wherein said instructions are further configured for displaying a user interface, which displays said plurality of gamut mode selectable features in a first window of said user interface and said graphical image in another window of said user interface.

10. The system of claim 8 wherein said instructions are further configured for releasing said image.

11. The system of claim 8 wherein said instructions are further configured for:
    image processing of said image by rendering at least one color space with respect to said image to at least one color print space.

12. The system of claim 8 wherein said instructions are further configured for:
    comparing at least one print space to a possible CMYK print space to determine said particular pixels benefiting with a particular print job/page.

13. The system of claim 8 wherein said instructions are further configured for:
    image processing of said image by rendering all color spaces with respect to said image to at least one color print space; and
    comparing said at least one multi color print space to a possible CMYK print space to determine said particular pixels benefiting with a particular print job/page.

14. The system of claim 8 wherein said at least one gamut mode selectable feature comprises printing CMYK with varying ink drop sizes to provide an indication of a benefit of utilizing greater or smaller ink drop sizes.

15. A graphical user interface for enabling optimal colorant job programming, said graphical user interface produced by an application program operating on a computing device having an electronic display, comprising:
    a first application program window presented on the electronic display, the first application program window being generated by the application program operating on the computing device, wherein the first application program window displays at least one gamut mode selectable feature from among a plurality of gamut mode selectable features for image processing of an image, wherein said at least one gamut checker options becomes available when a job is selected for extended gamut printing;
a second application program window presented on the electronic display, the second application program window being generated by the application program operating on the computing device, wherein the second application program window displays a graphical image based on at least one some image processing of said image in response to said selecting with at least one gamut checker option associated with a gamut checker, said at least one gamut mode selectable feature, wherein said displayed graphical image demonstrates a benefit of utilizing additional colorant on said image, wherein particular pixels in said graphical image that can benefit from said additional colorant are highlighted to demonstrate said benefit;
wherein said graphical image of said job is rendered via an MFD (Multi-Function Device) comprising a combined photocopier, printer, and scanner, said MFD having at least one marking device, in a response to a user input with respect to said MFD, wherein a media path in said MFD is positioned to supply sheets of media from a sheet supply to said at least one marking device wherein said graphical image of said job is rendered via at least one sheet derived from said sheet supply.

16. The graphical user interface of claim 15 wherein said image is released or re-programmed with different color settings based on said displayed graphical image to yield a different cost tradeoff.

17. The graphical user interface of claim 15 wherein image processing of said image includes rendering at least one color space with respect to said image to at least one color print space.

18. The graphical user interface of claim 15 wherein at least one print space is compared to a possible CMYK print space to determine said particular pixels benefiting with a particular print job/page.

19. The graphical user interface of claim 15 wherein:
image processing of said image includes rendering all color spaces with respect to said image to at least one color print space; and
said at least one multi color print space is compared to a possible CMYK print space to determine said particular pixels benefiting with a particular print job/page.

20. The method of claim 15 wherein said at least one gamut mode selectable feature includes a feature for initiating printing CMYK with varying ink drop sizes to provide an indication of a benefit of utilizing greater or smaller ink drop sizes.

* * * * *